(12) United States Patent
Zhang

(10) Patent No.: US 12,060,017 B1
(45) Date of Patent: Aug. 13, 2024

(54) CAR LICENSE PLATE HOLDER WITHOUT DRILLING HOLE

(71) Applicant: Tao Zhang, Jingzhou (CN)

(72) Inventor: Tao Zhang, Jingzhou (CN)

( * ) Notice: Subject to any disclaimer, the term of this patent is extended or adjusted under 35 U.S.C. 154(b) by 0 days.

(21) Appl. No.: 18/635,777

(22) Filed: Apr. 15, 2024

(51) Int. Cl.
*B60R 13/10* (2006.01)

(52) U.S. Cl.
CPC .................... *B60R 13/105* (2013.01)

(58) Field of Classification Search
CPC ............................. B60R 13/105; F16B 2/065
USPC .................................................... 40/200–211
See application file for complete search history.

(56) References Cited

U.S. PATENT DOCUMENTS

| | | | | |
|---|---|---|---|---|
| 1,080,631 A * | 12/1913 | Havemeyer | ........... | B60R 13/105 40/211 |
| 2,641,815 A * | 6/1953 | Leighton | ............... | B60R 13/105 248/316.1 |
| 3,908,296 A * | 9/1975 | Harrison | ............... | B60R 13/105 40/210 |
| 7,535,343 B1 * | 5/2009 | Pinckney | ................ | G09F 21/04 40/575 |
| 7,752,785 B2 * | 7/2010 | Beer | ..................... | B60R 13/105 24/DIG. 57 |
| 8,245,996 B1 * | 8/2012 | Ciabaszewski | ....... | B60R 13/105 280/765.1 |
| 9,725,052 B1 * | 8/2017 | Honaker | ................... | F16B 2/12 |
| 9,751,466 B2 | 9/2017 | Huang | | |
| 10,518,721 B1 * | 12/2019 | Nowakowski | ............ | G09F 7/18 |
| 11,780,385 B1 * | 10/2023 | Qu | ........................ | B60R 13/105 40/209 |
| 2010/0307038 A1 * | 12/2010 | Iverson | ................. | B60R 13/105 40/204 |
| 2015/0078861 A1 * | 3/2015 | Heinz | ....................... | G09F 7/18 411/368 |
| 2017/0203696 A1 | 7/2017 | Huang | | |

* cited by examiner

*Primary Examiner* — David R Dunn
*Assistant Examiner* — Christopher E Veraa
(74) *Attorney, Agent, or Firm* — Jeenam Park

(57) ABSTRACT

A car license plate holder without drilling holes is provided, which includes an adjustment screw rod, a rotation shaft screw, an arc-shaped groove, and the car license plate holder. The adjustment screw rod is connected to an anti-scratch pad through a thread fit, and slidably connected to a flipping bracket. A thread groove provided on the flipping bracket is connected to the rotation shaft screw, and the rotation shaft screw is rotatably connected to a fixed cross frame. The present application consists of the adjustment screw rod and a fixed block to form a fixed structure for a grille. The fixed cross frame and the car license plate holder form a fixed structure for the car license plate, and together with the flipping bracket, the fixed structure of the grille is combined with the fixed structure of the car license plate to form an overall structure of the holder.

7 Claims, 3 Drawing Sheets

CAR LICENSE PLATE HOLDER WITHOUT DRILLING HOLE

TECHNICAL FIELD

The present disclosure relates to the field of fixing and installation car license plate technologies, and in particular, to a car license plate holder without drilling holes.

BACKGROUND

The function of a car license plate holder is to install a car license plate onto the holder, which is then installed on the car to ensure that the car license plate will not fall off during driving. Currently, the installation methods of car license plate holders on the market mainly include the need to remove a grille to fix or drill holes, and are mainly used for special cars. The installation methods are different and cannot meet the conditions of high strength, easy installation, and adapting to various types of car grille. Therefore, a design of car license plate holders without drilling holes is innovative and matched with the grille of most car models on the market. It has the characteristics of no drilling holes, easy installation, strong fastening, few accessories, adjustable, and adapting to the grille of majority of car models, it is necessary to improve the practicality of the holder.

SUMMARY

The purpose of the present disclosure is to provide a car license plate holder without drilling holes, which is mainly used to solve the installation method of existing car license plate holders, which require disassembling the grille to fix or drilling holes and are mainly used for special cars. The installation methods are different and cannot meet the conditions of high strength, easy installation, and adapting to various types of grille of cars.

In order to solve the above-mentioned technical problems, the present disclosure provides the following technical solution: a car license plate holder without drilling holes, including an adjustment screw rod, an anti-scratch pad, a flipping bracket, a rotation shaft screw, a fixed cross frame, an arc-shaped groove, a fastening screw, and the car license plate holder, where the adjustment screw rod is connected to the anti-scratch pad through a thread fit, the adjustment screw rod is slidably connected to the flipping bracket, a thread groove provided on the flipping bracket is connected to the rotation shaft screw, the rotation shaft screw is rotationally connected to the fixed cross frame, one side of the fixed cross frame is provided with the arc-shaped groove.

In an embodiment, the fastening screw is slidably connected in the arc-shaped groove.

In an embodiment, the fastening screw is connected to the flipping bracket through a thread fit.

In an embodiment, a thread hole provided on the fixed cross frame is connected to a fixed bolt, the fixed bolt is sleeved in a fixed hole, the fixed hole is symmetrically provided on the car license plate holder, and the car license plate holder is tightly pressed on the fixed cross frame.

In an embodiment, the adjustment screw rod is connected to a fixed nut through a thread fit, and the flipping bracket is located between the fixed nut and the anti-scratch pad.

In an embodiment, a gasket is provided at a connection position between the flipping bracket and the fixed nut.

In an embodiment, one end of the adjustment screw rod far from the fixed nut is connected to connection holes through a thread fit, and the connection holes are uniformly provided on a fixed block.

The car license plate holder provided by the present disclosure has the advantages of: a fixed structure of a grille is formed by the adjustment screw rod and the fixed block, the fixed cross frame and the car license plate holder form a fixed structure of the car license plate holder, and combined with the flipping bracket to form an overall structure of the holder. A connecting hole for installing the grille on the fixed block and the fixing hole for installing the car license plate on the car license plate holder both have multiple aperture specifications, which can be adapted to different grille and car license plates, and have the characteristics of no drilling, easy installation, strong fastening, few accessories, and wide adaptability to car types; the fixed cross frame is supported on the flipping bracket by the rotation shaft screw, and fixed with the fastening screw to facilitate the adjustment of pitch angle of the car license plate holder, which improves the practicality of the holder.

BRIEF DESCRIPTION OF DRAWINGS

In order to provide a clearer explanation of the embodiments of the present disclosure or the technical solutions in the prior art, a brief introduction will be given below to the accompanying drawings required in the embodiments or the description of the prior art. It is obvious that the accompanying drawings in the following description are some embodiments of the present disclosure. For those skilled in the art, other accompanying drawings can be obtained based on these drawings without creative work.

NUMBER REFERENCE

1. Adjustment screw rod; 2. Anti-scratch pad; 3. Flipping bracket; 4. Rotation shaft screw; 5. Fixed cross frame; 6. Arc-shaped groove; 7. Fastening screw; 10. Car license plate holder t; 11. Fixed nut; 12. Gasket; 13. Fixed block; 14. Connection hole; 15. Fixed hole; 16. Fixed bolt.

DESCRIPTION OF EMBODIMENTS

In order to clarify the purpose, technical solution, and advantages of the embodiments of the present disclosure, the following will provide a clear and complete description of the technical solution in the embodiments of the present disclosure in combination with the accompanying drawings. Obviously, the described embodiments are a part of the embodiments of the present disclosure, not all of them. Based on the embodiments in the present disclosure, all other embodiments obtained by those skilled in the art without creative work fall within the protection scope of the present disclosure.

In the description of the present disclosure, it should be noted that unless otherwise specified and limited, terms "installation", "connection to", and "connection with" should be broadly understood, for example, it can be a fixed connection, a detachable connection, or an integrated connection; it can be a mechanical connection or an electrical connection; it can be a direct connection, or an indirect connection through an intermediate medium, or it can be an internal connection between two components. For those skilled in the art, the specific meanings of the above terms in the present disclosure can be understood in specific situations.

Figure 1:
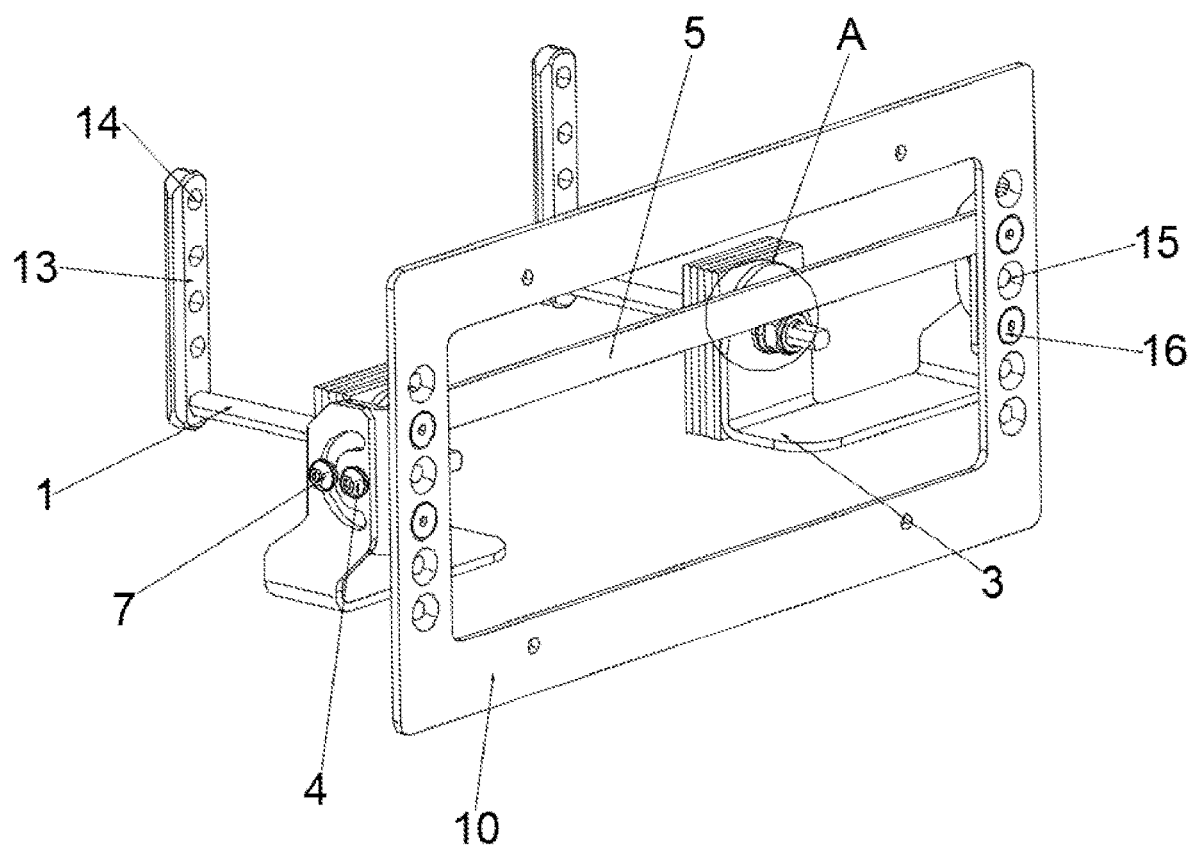
FIG. 1 is a three-dimensional diagram of an overall structure of the present disclosure.
Figure 2:
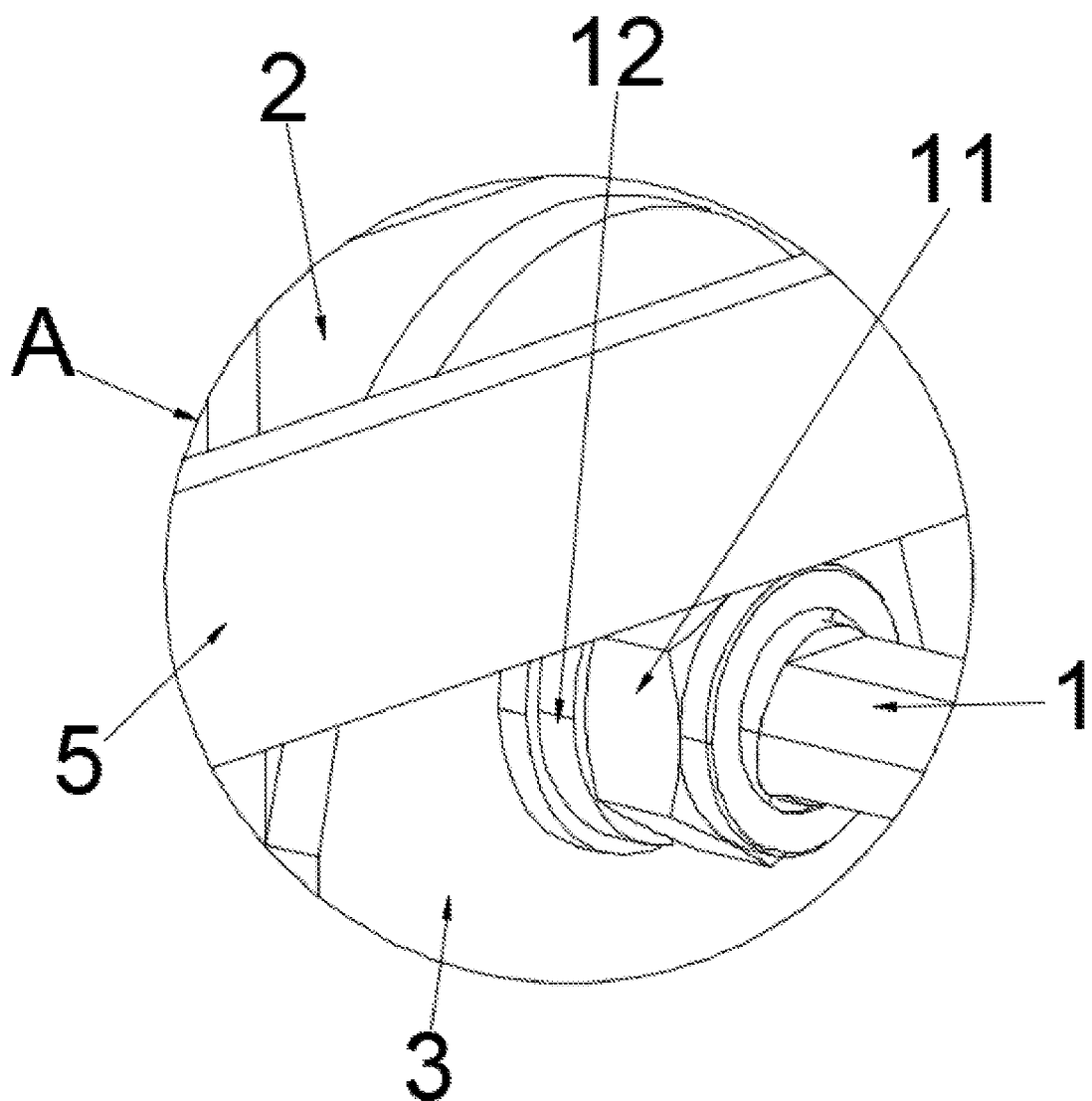
FIG. 2 is a locally enlarged view of region A in FIG. 1.
Figure 3:
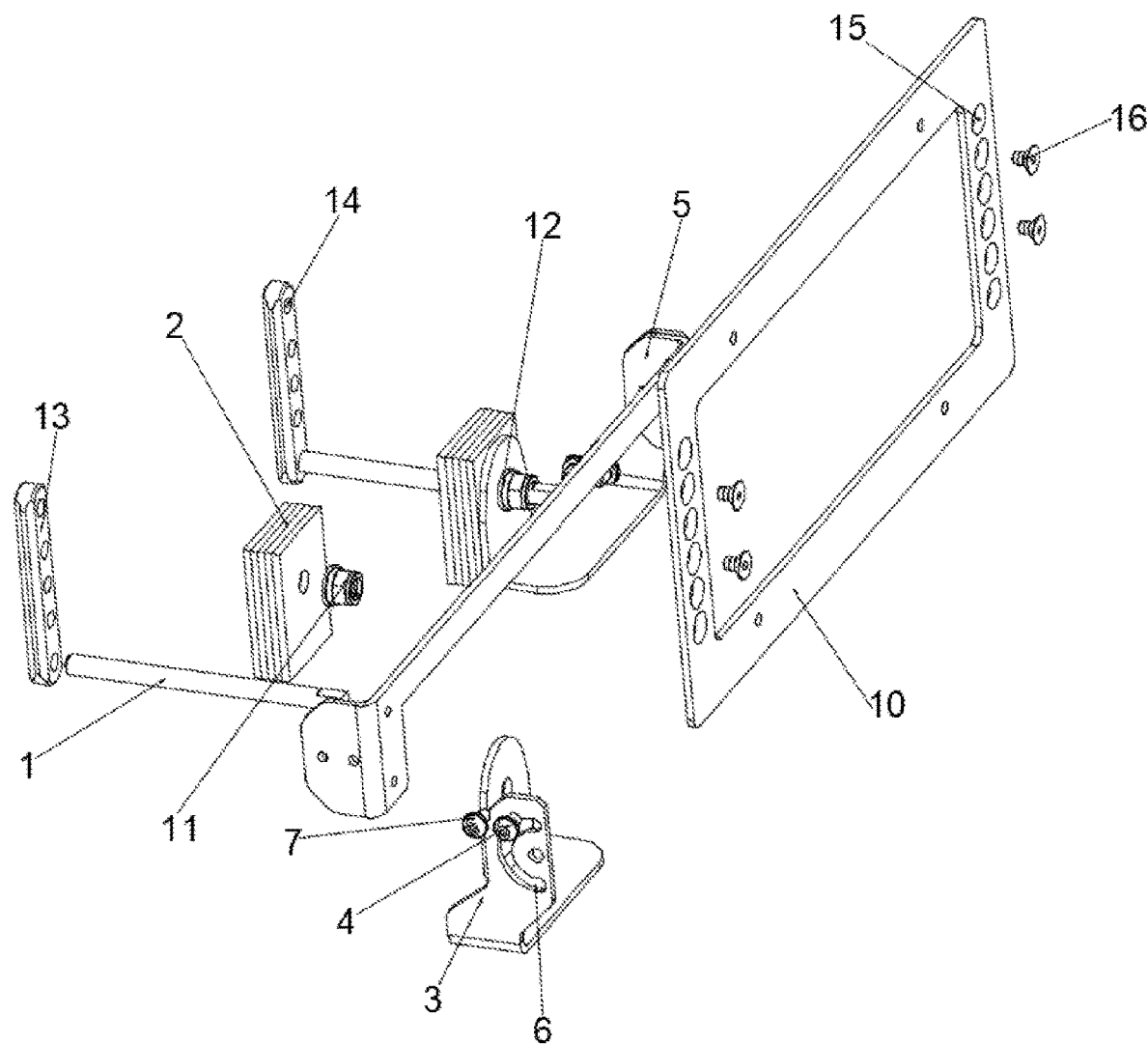
FIG. 3 is an exploded view of the overall structure of the present disclosure.

Please refer to FIGS. 1-3, an embodiment provided by the present disclosure: a car license plate holder without drilling holes, including an adjustment screw rod 1, an anti-scratch pad 2, a flipping bracket 3, a rotation shaft screw 4, a fixed cross frame 5, an arc-shaped groove 6, a fastening screw 7, and the car license plate holder 10. The adjustment screw rod 1 is connected to the anti-scratch pad 2 through a thread fit, and the adjustment screw rod 1 is slidably connected to the flipping bracket 3. A thread groove provided on the flipping bracket 3 is connected with the rotation shaft screw 4, the rotation shaft screw 4 is rotatably connected to the fixed cross frame 5, one side of the fixed cross frame 5 is provided with the arc-shaped groove 6. In the arc-shaped groove 6, a fastening screw 7 is slidably connected, and the fastening screw 7 is connected to the flipping bracket 3 through a thread fit. A thread hole provided on the fixed cross frame 5 is matched and connected with a fixed bolt 16, which is sleeved in the fixed hole 15, and the fixed hole 15 is symmetrically provided on the car license plate holder 10. The car license plate holder 10 is tightly pressed on the fixed cross frame 5, and the fixed hole 15 has multiple sizes and specifications, suitable for different car license plates. The adjustment screw rod 1 is connected to a fixed nut 11 through a thread fit, and the flipping bracket 3 is located between the fixed nut 11 and the anti-scratch pad 2. A gasket 12 is provided at a connection position between the flipping bracket 3 and the fixed nut 11. One end of the adjustment screw rod 1 that is far away from the fixed nut 11 is connected to connecting holes 14 through a thread fit, and the connecting holes 14 are uniformly provided on a fixed block 13. The connecting holes 14 have different aperture specifications at different positions and are suitable for different grille sizes. By setting the anti-scratch pad 2, a friction force between the fixed nut 11 and the anti-scratch pad 2 is increased, thereby avoiding the fixed nut 11 from falling off from the adjustment screw rod 1 during use, and ensuring a support stability of the holder.

Specifically, when in use, a fixed structure of a grille is composed of the adjustment screw rod 1 and the fixed block 13, the fixed cross frame 5 and the car license plate holder 10 form a fixed structure of the car license plate, and the flipping bracket 3 combines the fixed structure of the grille with the fixed structure of the car license plate to form an overall structure of the holder. The connecting holes 14 for installing the grille on the fixed block 13 and the fixed hole 15 for installing the car license plate on the car license plate holder 10 both have multiple aperture specifications, which can be adapted to different grille and car license plates, and have the characteristics of no drilling, easy installation, strong fastening, few accessories, and wide adaptability to car models; by the rotation shaft screw 4, the fixed cross frame 5 is supported on the flipping bracket 3 and fixed with the fastening screw 7, which facilitates the adjustment of the pitch angle of the car license plate holder 10 and improves its practicality.

In the description of the present disclosure, it should be noted that unless otherwise specified and limited, terms "installation", "connection to", and "connection with" should be broadly understood, for example, it can be a fixed connection, a detachable connection, or an integrated connection; it can be a mechanical connection or an electrical connection; it can be a direct connection, or an indirect connection through an intermediate medium, or it can be an internal connection between two components. For those skilled in the art, the specific meanings of the above terms in the present disclosure can be understood in specific situations.

The embodiments of device described above are only illustrative, where the units described as a separate component may or may not be physically separated, and the component displayed as a unit may or may not be a physical unit, that is, it can be located in one place or distributed across multiple network units. Some or all modules can be selected according to an actual need to achieve a purpose of this embodiment. Those skilled in the art can understand and implement it without creative work.

Finally, it should be noted that the above embodiments are only used to illustrate the technical solution of the present disclosure, and not to limit it; although the present disclosure has been described in detail with reference to the embodiments, those skilled in the art should understand that they can still modify the technical solutions recorded in the embodiments or equivalently replace some of the technical features thereof; and these in modifications or replacements do not make the essence of the corresponding technical solutions deviate from the spirit and scope of the technical solutions of the various embodiments of the present disclosure.

What is claimed is:

1. A car license plate holder without drilling holes, comprising an adjustment screw rod, an anti-scratch pad, a flipping bracket, a rotation shaft screw, a fixed cross frame, an arc-shaped groove, a fastening screw, and the car license plate holder,
    wherein the adjustment screw rod is connected to the anti-scratch pad through a threaded fit, the adjustment screw rod is slidably connected to the flipping bracket, a thread groove provided on the flipping bracket is connected to the rotation shaft screw, the rotation shaft screw is rotationally connected to the fixed cross frame, one side of the fixed cross frame is provided with the arc-shaped groove.

2. The car license plate holder according to claim 1, wherein the fastening screw is slidably connected in the arc-shaped groove.

3. The car license plate holder according to claim 2, wherein the fastening screw is connected to the flipping bracket through a thread fit.

4. The car license plate holder according to claim 1, wherein a thread hole provided on the fixed cross frame is connected to a fixed bolt, the fixed bolt is sleeved in a fixed hole, the fixed hole is symmetrically provided on the car license plate holder, and the car license plate holder is tightly pressed on the fixed cross frame.

5. The car license plate holder according to claim 1, wherein the adjustment screw rod is connected to a fixed nut through a thread fit, and the flipping bracket is located between the fixed nut and the anti-scratch pad.

6. The car license plate holder according to claim 5, wherein a gasket is provided at a connection position between the flipping bracket and the fixed nut.

7. The car license plate holder according to claim 5, wherein one end of the adjustment screw rod far from the fixed nut is connected to connection holes through a thread fit, and the connection holes are uniformly provided on a fixed block.

* * * * *